(No Model.)
A. BEVER.
CABINET SHOW CASE.
No. 557,948. Patented Apr. 7, 1896.
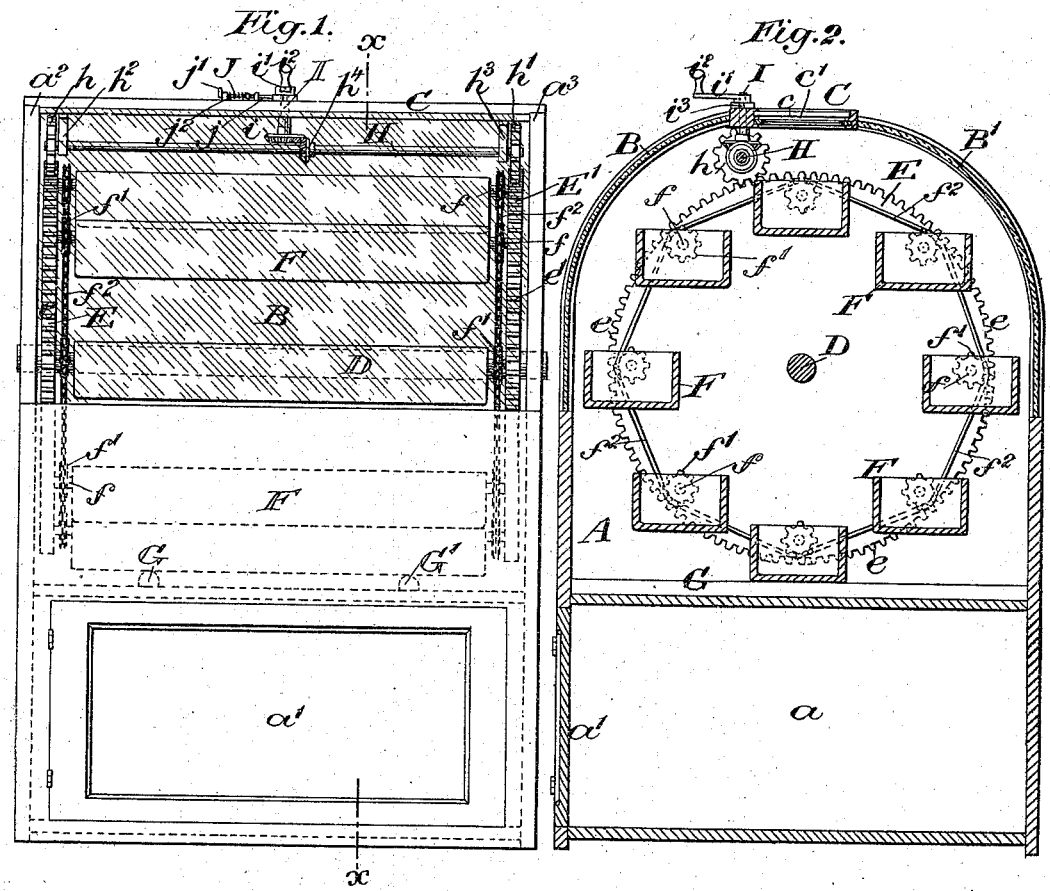
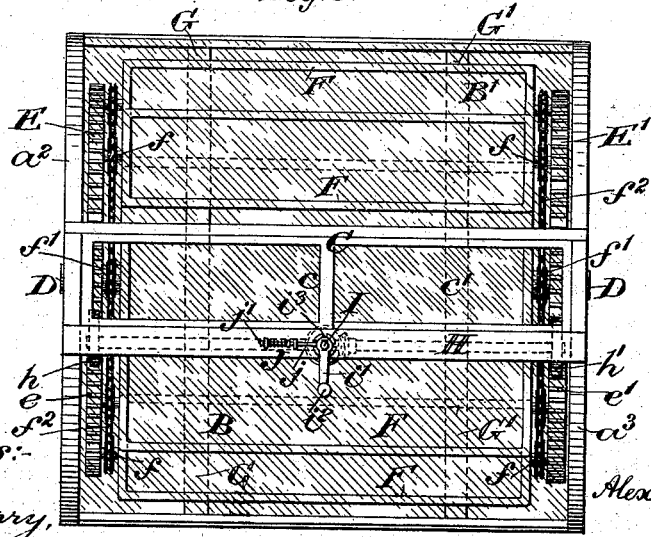
Witnesses:—
George Barry,
W. B. Seward
Inventor.
Alexander Bever
by attorneys
Brown & Seward

UNITED STATES PATENT OFFICE.

ALEXANDER BEVER, OF CHICAGO, ILLINOIS.

CABINET SHOW-CASE.

SPECIFICATION forming part of Letters Patent No. 557,948, dated April 7, 1896.

Application filed July 5, 1895. Serial No. 554,958. (No model.)

*To all whom it may concern:*

Be it known that I, ALEXANDER BEVER, of Chicago, in the county of Cook and State of Illinois, have invented a new and useful Improvement in Cabinet Show-Cases, of which the following is a specification.

My invention relates to an improvement in cabinet show-cases, the object being to provide a revolving show-case in which different varieties of goods may be displayed at the same time and in which the several parts are assembled in a very compact and convenient form. This case is especially adapted for fancy dry goods and notions of all kinds, such as cigars, books, stationery, gents' neckwear, &c.

A further object is to provide a revolving show-case in which the several trays which contain the goods may be successively brought into position to have their contents or a portion of their contents removed, the trays being held against tipping while such goods are being removed.

A practical embodiment of my invention is represented in the accompanying drawings, in which—

Figure 1 is a front view of the case. Fig. 2 is a transverse vertical section on the line $x\ x$ of Fig. 1, and Fig. 3 is a top plan view of the case.

A suitable casing for inclosing the several parts is designated by A, and at its base it is provided with a suitable closet-space $a$, having door $a'$ for gaining access thereto. This space may be used for the storage of articles for supplying the several trays of the case.

The side walls $a^2\ a^3$ of the casing A are extended upwardly from the base portion and they are connected together by transparent glass panes B B', through which the interior of the casing may be plainly seen.

The top of the casing A is provided with a suitable delivery-opening through which the articles to be vended may be withdrawn when desired. This opening is formed by a suitable window-frame C, which extends between the tops of the side walls $a^2\ a^3$ of the casing, and it is provided with suitable sliding windows or doors $c\ c'$, so that when the casing is not in use the said doors or windows may be closed to prevent the access of dust and dirt to the goods within the casing. The edges of the side walls $a^2\ a^3$ and the panes of glass B B' are preferably of curved form for presenting a neat and attractive appearance.

The trays for containing the articles are mounted within the casing A in the following manner: A suitable shaft D extends transversely through the casing A and is mounted to rotate at its ends in the side walls $a^2\ a^3$. Adjacent to the side walls $a^2\ a^3$ and within the casing A, I secure, so as to rotate with the shaft D, two wheels or disks E E'. The several trays are denoted by F, and they extend across the space between the wheels E E'. Each of these trays F is attached to the two wheels E E', near their outer circumferences, so as to normally hang in a horizontal position, by means of suitable pivot-shafts $f$, which are secured to the ends of the tray F and are free to rotate in the wheels E E'. Upon the shafts $f$ of each of the trays F, I secure a sprocket-gear $f'$. The endless sprocket-chain $f^2$ engages each one of the sprocket-wheels $f'$, so that all of the trays are controlled by the tilting movement of one of the said trays.

For preventing the trays from tilting or upsetting and for holding the tray from which the goods are being removed from tilting I extend, from front to rear across the casing A on its interior, guide rods or bars G G', which engage the bottom of the lowermost tray F when the upper tray is in position directly beneath the window-sashes $c\ c'$ in the window-frame C at the top of the casing.

The means which I employ for bringing the trays successively into position beneath the windows $c\ c'$ is as follows: The wheels E E' are provided along their circumferences with spur-teeth $e\ e'$, which intermesh with pinions $h\ h'$, mounted to rotate upon a suitable cross-shaft H, which extends transversely across the interior of the casing A. This shaft H is mounted to rotate in suitable bearings $h^2\ h^3$, secured to the under side of the frame C. This shaft H is provided in the present instance near its middle portion with a bevel-gear $h^4$, which intermeshes with a bevel-gear $i$ upon the end of the operating crank-shaft I, which is mounted to rotate in one of the side rails of the window-casing C. This shaft I is provided exterior to the casing A with a suitable crank $i'$, having an operating-handle $i^2$. It will thus be seen that the crank $i'$ may be turned in either direction, thereby bringing the several trays F successively into position to have their contents removed through the window-frame C.

For locking the parts against movement I provide a locking device J, which consists of a suitable sliding bolt $j$, provided with a handle $j'$, the said bolt being normally held at the limit of its advance movement with its nose in engagement with suitable notches $i^3$ in the shaft I by a suitable coiled spring $j^2$, which surrounds the said bolt $j$. When desired to bring the trays successively up into position to have articles withdrawn therefrom, the bolt $j$ is withdrawn, thereby allowing the crank $i'$ to be turned.

In the accompanying drawings I have shown each of the trays F as provided with two sprocket-wheels—one at each end—but, if found desirable, in show-cases of narrow width only one set of sprocket-wheels and one sprocket-chain might be employed; also the shaft H might be provided with one pinion only, intermeshing with one of the wheels E E', instead of two pinions, if found desirable.

It will be seen that the cabinet as thus constructed will present to view through the glass panels B B' all of the trays within the casing, the contents of the trays at the same time being fully protected from dust and dirt. Furthermore, by thus displaying the contents of the several trays the article desired may be quickly selected without unnecessary handling of the contents of the several trays.

In the accompanying drawings I have shown the show-case as provided with eight of these trays; but it is understood that I may increase or diminish the number of said trays, as found desirable. Furthermore, the case may be made of any suitable size to accommodate different classes of articles.

It is evident that slight changes might be resorted to in the form and arrangement of the several parts without departing from the spirit and scope of my invention. Hence I do not wish to limit myself strictly to the structure herein set forth; but

What I claim is—

1. In combination, a suitable casing provided with a delivery-opening, a series of trays mounted within the casing to move together with their support and also together independently of their support, means for presenting the trays successively at the delivery-opening, means in position to successively engage the trays for regulating their tilting movements, and a connection common to all the trays whereby the regulation of one of the trays regulates them all, substantially as set forth.

2. In combination, a suitable casing provided with a delivery-opening, a series of trays mounted within the casing to move together with their support and also independently of their support, means for presenting the trays successively at the delivery-opening, a bar in position to engage one of the trays for regulating its tilting movement and a connection common to all of the trays, whereby the regulation of one of the trays regulates them all, substantially as set forth.

3. In combination, a suitable casing having a delivery-opening therein, a rotary shaft extending through the casing, tray-supporting wheels secured to rotate with said shaft, trays loosely hung between said wheels, sprocket-wheels secured to said trays, a sprocket-chain connecting said wheels, an operating-shaft having a geared connection with another of said wheels for presenting the trays successively at the delivery-opening and a cross-bar within the casing engaging one of the said trays for holding the said trays in their upright position, substantially as set forth.

ALEXANDER BEVER.

Witnesses:
C. H. GARVER,
IRA BROWN.